United States Patent [19]

Hertel

[11] 3,842,470

[45] Oct. 22, 1974

[54] TOOL HOLDER FOR A CUTTING TOOL

[76] Inventor: Karl Hertel, Oedenberger Strabe 29, Nuernberg, Germany

[22] Filed: Feb. 26, 1973

[21] Appl. No.: 335,652

[30] Foreign Application Priority Data

Mar. 7, 1972 Germany............................ 2210816

[52] U.S. Cl. .................................................. 29/98
[51] Int. Cl............................................... B26d 1/00
[58] Field of Search............................ 29/96, 95, 98

[56] References Cited
UNITED STATES PATENTS

| | | | |
|---|---|---|---|
| 2,962,800 | 12/1960 | Swenson................................ | 29/98 |
| 3,176,377 | 4/1965 | Milewski............................... | 29/96 |
| 3,303,553 | 2/1967 | Severson............................... | 29/96 |
| 3,497,934 | 3/1970 | Hudson.................................. | 29/96 |
| 3,546,759 | 12/1970 | Sirola................................. | 29/96 X |

FOREIGN PATENTS OR APPLICATIONS 1,347,086  11/1963  France.................................... 29/96

Primary Examiner—Francis S. Husar
Assistant Examiner—W. R. Briggs
Attorney, Agent, or Firm—Spencer & Kaye

[57] ABSTRACT

A turning tool including a generally rhombic turning tool bit having a pair of parallel main cutting faces, a pair of parallel subsidiary cutting faces arranged at an obtuse angle to the main cutting faces, parallel end faces blunting the acute angles of the rhombic tool bit and parallel upper and lower faces, and a tool holder comprising a tool holder body having formed therein an open sided tool bit receiving recess, the floor of the recess being engageable by the lower face of the tool bit, an end wall of the recess being engageable by one of the end faces of the tool bit and the side wall of the recess being engageable by one of the main cutting faces, an adjustable stop mounted adjustably on the body and having an abutment face forming a wall of the recess, engageable by one of said subsidiary cutting faces and arranged at an acute angle to the side wall, and engageable with one of said main cutting faces, and means to clamp the tool bit on the tool holder against at least the end and side walls of the recess.

16 Claims, 7 Drawing Figures

TOOL HOLDER FOR A CUTTING TOOL

The present invention relates to a tool holder for a cutting tool. One particular form of cutting tool has a reversible cutter bit, which is generally rhombic in shape, having a pair of parallel main cutting faces, a pair of parallel subsidiary cutting faces arranged at an obtuse angle to the main cutting faces, parallel end faces blunting the acute angles of the rhombic tool bit and parallel upper and lower faces. The bit is clamped in a holder and commonly at least three of such tools are distributed in a star-shaped pattern around the shaft to be turned in a shaft turning machine. In such shaft turning machines, shafts are produced in a single process step to an accuracy of fit of up to H 7.

In the shaft turning tool of this type the lateral faces of the bit which contact the workpiece match inasmuch the main cutting face, the subsidiary cutting faces and the end face all engage the workpiece and an exactly similar contact should take place when the tool is reversed. Only with very considerable manufacturing effort is it possible to ensure that in every case the reversible cutter bit makes contact equally well on all three lateral contact faces and is correspondingly supported when reversed.

Since it is intended to manufacture accurately fitting shafts with tools of this type in merely one process step, a re-adjustment within the shaft turning machine is frequently necessary. This is in particular so in order to ensure that the subsidiary cutting edge in the operating position merely re-smoothes but does not re-cut or produce any smoothing effect. In order to make such a re-adjustment, the entire holder must be adjusted.

According to the invention there is provided a tool holder for a generally rhombic turning tool bit having a pair of parallel main cutting faces, a pair of parallel subsidiary cutting faces arranged at an obtuse angle to the main cutting faces, parallel end faces blunting the acute angles of the rhombic tool bit and parallel upper and lower faces, such holder comprising a tool holder body having formed therein an open sided tool bit receiving recess, the floor of the recess being engageable by the lower face of the tool bit, an end wall of the recess being engageable by one of the end faces of the tool bit and the side wall of the recess being engageable by one of the main cutting faces, an adjustable stop mounted adjustably on the body and having an abutment face forming a wall of the recess, engageable by one of said subsidiary cutting faces and arranged at an acute angle to the side wall, and engageable with one of said main cutting faces, and means to clamp the tool bit on the tool holder against at least the end and side walls of the recess.

With such a construction, although the tool bit is supported from all sides, it is possible to re-adjust it within its holder and thus the holder itself does not have to be slackened or adjusted for this re-adjustment.

The tool bit is appropriately fixed in the holder by the bit being provided with a central through-bore, substantially at right angles to its upper and lower faces, for the engagement of clamping means. Preferably the clamping means is a clamping bolt which is carried in a socket in the region of the underside of the holder and can be displaced sideways in the direction of the contact face as described in German Offenlegungsschrift (Laid Open Application) No. 1,938,405.

Advantageously, the adjustable stop is in the form of a wedge, of which a first wedge face abuts one of the main cutting faces of the bit while the second wedge face rests against the holder. Here, the wedge should be guided so that it can be displaced in the direction of its longitudinal axis and can be fixed relative to the holder. In order to prevent the wedge riding up, it is furthermore the second wedge face and the cooperating face of the holder which have cooperating dovetail-like undercuts. In order to ensure that the stop makes two-dimensional contact with the cutter bit in several positions of the stop, the contact face of the wedge on the holder is appropriately of convex curvature. It is possible for the same purpose, for the stop to be formed as two components, one being supported on the tool holder and the other so that it can be swivelled relative to the one component about an axis which is substantially perpendicular to the recess floor, the other component abutting the tool bit.

In order to ensure particularly advantageous support of said other component against the high cutting pressures which act on it in operation, it is furthermore possible to provide that the rear lateral face of the stop component is of convex curvature in the shape of a segment of a circle, that the axis of curvature coincides with the swivel axis and that the rear lateral face of said other component rests against the one component on a contact face of complementary shape.

The longitudinal adjustment of the wedge should be preferably made by an adjustment screw which is operated by means of an externally engaging spanner.

In order to ensure optimum two-dimensional contact of all lateral faces of the cutter bit against the holder it is further possible to provide that the side wall of the recess is one face of a second adjustable stop which is carried so that it can be swivelled about an axis which is substantially at right angles to the recess floor. In order here again to ensure optimum support against the high cutting pressures it is furthermore possible for the face of the second adjustable stop remote from the cutting bit to be of convex curvature in the shape of a segment of a circle, the axis of curvature coinciding with the swivel axis and for the tool holder to have a complementary concave face.

In order that the invention will be better understood, the following description is given, merely by way of example, reference being made to the accompanying drawings, in which.

Figure 1:
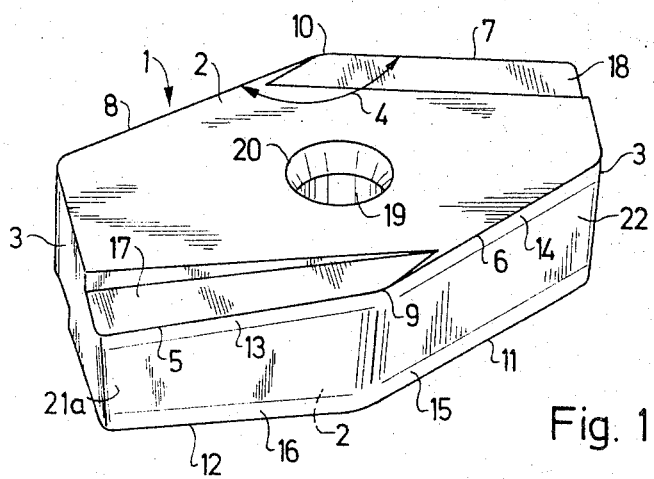
FIG. 1 is a perspective view of one form of reversible tool bit for mounting in one embodiment of tool holder according to the invention.
Figure 2:
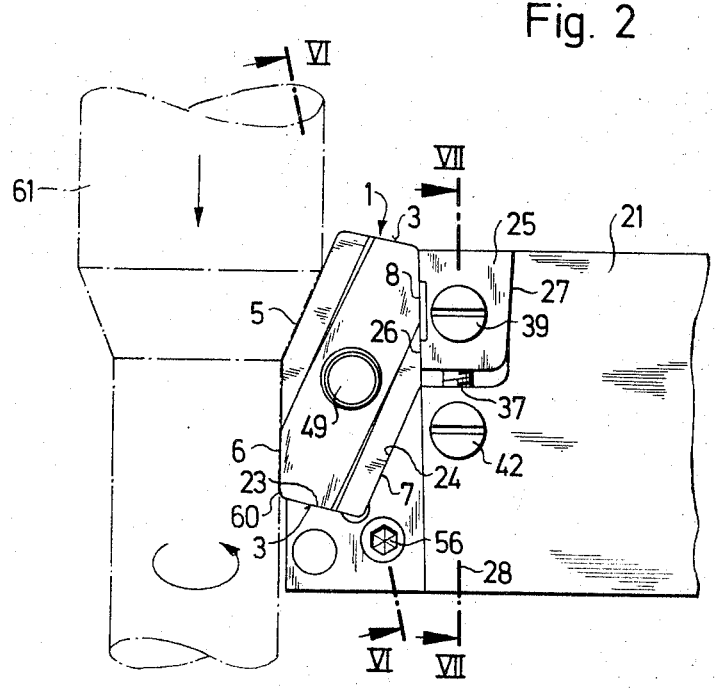
FIG. 2 is a plan view of the bit mounted in a tool holder according to the invention with the workpiece shown in broken lines.

The reversible cutter bit 1 essentially has a generally rhombic shape, having upper and lower parallel faces 2. The acute angles of the rhombus are blunted by end faces 3. The sides of the rhombus form an obtuse angle 4 and include main cutting faces 5, 7 and subsidiary cutting faces 6, 8. The cutting points associated with the upper face 2 are marked 9, 10. The construction of the lower face 2 corresponds to that of the upper face 2 shown in FIG. 1. The lateral edge 11 of the lower face 2 is a main cutting edge and the lateral edge 12 is a subsidiary cutting edge. The chamfers of the free faces are marked 13, 14, 15, 16, to the extent that they are visible in FIG. 1. The clearance grooves associated with the main cutting edges 5, 7 are marked 17, 18.

The cutter bit 1 is provided with a central throughbore 19 which runs substantially at right angles to its upper and lower faces 2, the through-bore 19 having countersunk portions 20 at each end. The lateral faces 21, 22 and the end faces 3 extend substantially at right angles to the top and bottom faces 2.

The holder 21 is provided, at its front end, with a recess for supporting the tool bit 1 against the three faces 3, 5 and 6. The bottom face 2 of the tool bit 1 rests on the upper surface of a clamping plate 53 forming the floor of the recess. The bit 1 rests, with the end face 3 which adjoins the free face 22 of the subsidiary cutting face 6 which is in the operating position, against an end wall 23 of the recess in the holder 21. The bit 1 also rests, with the free face of the main cutter edge 7 which is in the rest position, against a side wall 24 of the recess. The cutter bit 1 rests with the free face 22 of the subsidiary cutting faces 8, which is in the rest position, against a stop 25 which is adjustable relative to the holder 21.

The stop 25 is a wedge of which a first face 26 contacts the cutter bit 1. The other wedge face 27 rests against the holder 21. The wedge is guided so that it is displaceable in the direction of its longitudinal axis 28 and can be fixed relative to the holder 21.

Figure 3:
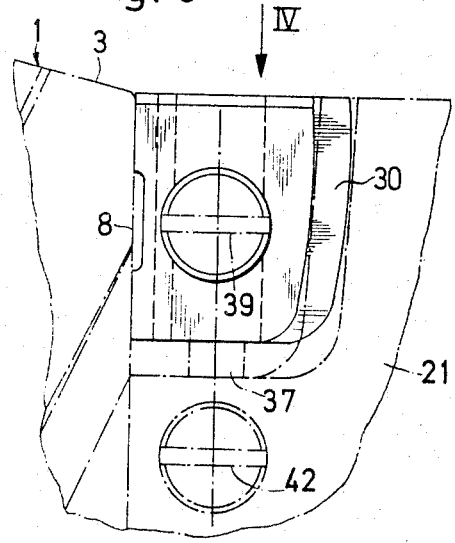
FIG. 3 is an enlarged detailed plan view analogous to FIG. 2, of a modified embodiment of the adjustable stop for the lateral support of the tool bit.
Figure 4:
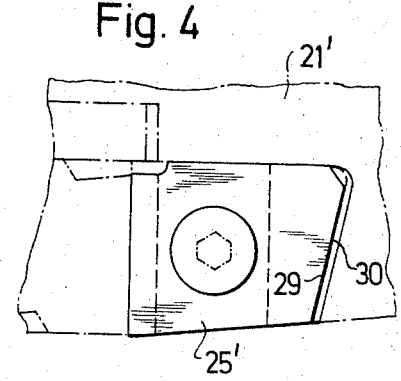
FIG. 4 is a view in the direction of the arrow IV of the stop according to FIG. 3.

In the embodiment according to FIGS. 3 and 4 the second face 29 of the wedge 25' against the holder 21' is undercut in a dovetail-like manner. The corresponding contact face 30 of the wedge 25' is designed to slope corresponding to the undercut. Furthermore, the contact face 30 of the wedge is constructed with a convex curvature (FIG. 3).

Figure 5:
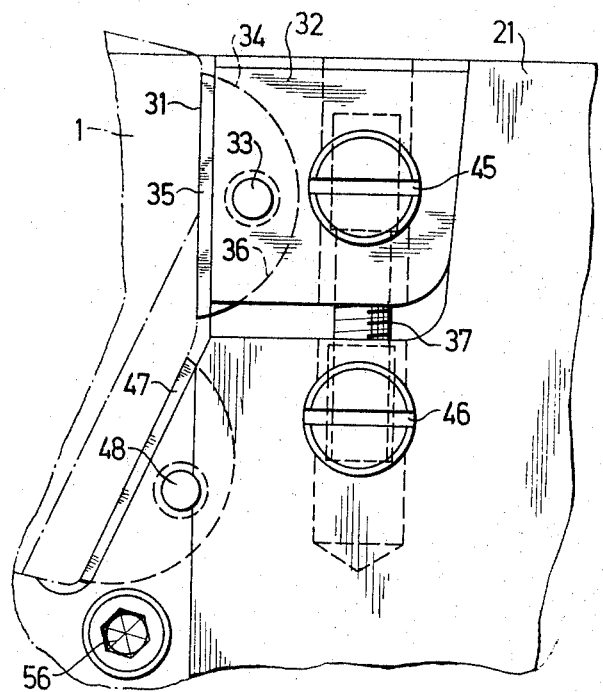
FIG. 5 is a detailed plan view of another modified embodiment of the holder analogous to the plan view in FIG. 2.
Figure 6:
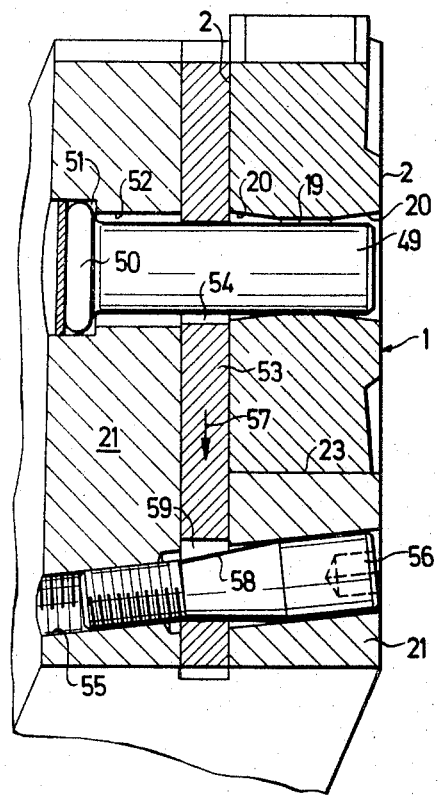
FIG. 6 is a section taken along the line VI—VI in FIG. 2.
Figure 7:
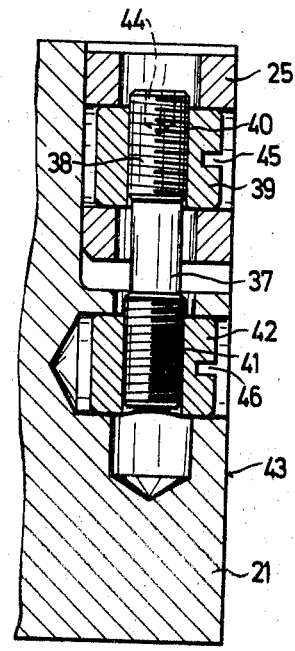
FIG. 7 is a section taken along the line VII—VII in FIG. 2.

In the embodiment according to FIG. 5, the stop includes a first component 32 mounted on the holder 21 and a second component 35 swivellable on component 32 about a pin 33 which is substantially at right angles to the cutter bit top face 2. The rear face 34 of the stop component 35 possesses a circular convex curvature. The center of curvature coincides with the axis of pin 33. The rear face 34 of the stop component 35 rests against a complementary concave face 36 on the component 32. The wedge angle of the stop 25, 25', 32 points towards the holder, 21'. The longitudinal adjustment of the stop 25, 25', 32 is effected by an adjustment bolt (FIGS. 5 and 7). The bolt has a threaded spindle 37. The thread 38 of the threaded spindle 37 is guided on the stop 25, 25', 32 in a second bolt 39 which is carried so that it can be rotated about an axis which is substantially at right angles to the top face 2 of the cutter bit. The bolt 39 is carried in an internal thread 40 introduced in the radial direction. The bolt 39 is carried, with a loose fit, within the stop 25, 25', 32. The threaded spindle 37 is screwed by means of a further thread 41 into a further bolt 42 which is carried with a loose fit within the holder 21, approximately at right angles to its top face 43. The two threads 38 and 41 are of opposite direction. The two bolts 39, 42 are moved towards one another or away from one another by turning the threaded spindle 37, for example by means of an Allen key engaging in the Allen head 44. This effects the relative adjustment of the stop 25, 25', 32 with regard to the holder 21.

The ends of the bolts 39, 42 are freely accessible from the holder top face 43 and are each provided with a screw slot 45, 46.

The side wall 24 of the holder recess which adjoins the stop 25, 25', 32 is, in the embodiment according to FIG. 5, part of a second stop 47 which can be swivelled about an axis which is at right angles to the holder top face 43. The construction of the back of the second stop 47 substantially corresponds to that of the stop component 35. In this region of the stop 47, support relative to the holder 21 is provided. The stop 47 can be swivelled, with slight play, about the bolt 48. The longitudinal axis of the bolt 48 runs substantially at right angles to the top face 43 of the holder 21.

The tool bit 1 is clamped by the clamping bolt 49. The clamping bolt 49 is provided, at its end which faces away from the tool bit 1, with a head 50, by means of which it rests in a shoulder 51 of the holder 21. The bore 52 of the holder 21 receives the clamping bolt 49 to give a loose fit, such that the shoulder 51 acts like a ball socket and the clamping bolt 49 can be articulated sideways. The tool bit 1 rests on a support plate 53 which is constructed as a clamping device for the clamping bolt 49. The support plate 53 is provided with a bore 54 which surrounds the clamping bolt 49 to give a loose fit. A screw 56 screwed into an internal thread 55 of the holder 21 effects a clamping of the clamping plate 53 in the direction of the arrow 57, in the way which forms the subject of German Offenlegungsschrift (Laid Open Application) No. 1,938,405 which forms part of the disclosure of the present description. The screw 56 is screwed into the holder 21 at an angle and is provided with a conical region 58.

The screw 56 engages, with the conical region 58, in a bore 59 of the clamping plate 53. The bore 59 surrounds the screw 56 to give a very loose fit. The diameter of the bore 59 corresponds at least to the external diameter of the head of the screw 56.

The countersunk portions 20 of the cutter bit 1 reach as far as the region of engagement of the clamping bolt 49.

To clamp the cutter bit 1, the clamping screw 56 is first tightened so that the lower face of the cutter bit 1 rests on the clamping plate 53 and its faces 3, 7 rest against the corresponding faces 23, 24 of the holder 21. The stop 25, 25', 32 is then tightened by means of the spindle 37. The cutter bit 1 is re-adjusted within the holder recess by further tightening or slackening of the stop 25, 25', 32, in the course of which the tool bit 1 performs a slight rotation about the bolt 49. By means of this, the free edge 60 of the subsidiary cutting face 6 is set to a greater or lesser degree in the direction towards the axis of the workpiece 61, or is swung away therefrom.

I claim:

1. A tool holder for a generally rhombic turning tool bit, having a pair of parallel main cutting faces, a pair of parallel subsidiary cutting faces, arranged at an obtuse angle to the main cutting faces, parallel end faces blunting the acute angles of the rhombic tool bit and parallel upper and lower faces, said holder comprising, in combination:

a. a tool holder body;
b. means defining an open sided tool bit receiving recess in the tool holder body;
c. a floor of said recess engageable by the lower face of the tool bit;
d. an end wall of the recess engageable by one of the end faces of the tool bit;
e. a side wall of the recess engageable by one of the main cutting faces;
f. an adjustable stop mounted adjustably on the body for pivoting about an axis which is substantially perpendicular to said floor of said recess, said adjustable stop includes a first component adjustably securable in said recess, and a second component mounted on said first component and having a curved face forming an arc of a circle and conforming to a complementary concave face on said first component;
g. an abutment face provided on said second component, said abutment face forming a wall of the recess and being engageable by one of the cutting faces and arranged at an acute angle to said side wall; and
h. means to clamp a tool bit on the tool holder against at least the end and side walls of the recess.

2. A tool holder for a generally rhombic turning tool bit, having a pair of parallel main cutting faces, a pair of parallel subsidiary cutting faces, arranged at an obtuse angle to the main cutting faces, parallel end faces blunting the acute angles of the rhombic tool bit and parallel upper and lower faces, said holder comprising, in combination:

a. a tool holder body;
b. means defining an open sided tool bit receiving recess in the tool holder body;
c. a floor of said recess engageable by the lower face of the tool bit;
d. an end wall of the recess engageable by one of the end faces of the tool bit;
e. a side wall of the recess engageable by one of the main cutting faces;
f. a wedge forming an adjustable stop, mounted adjustably on the body, said wedge having first and second wedge faces forming an acute angle to one another and lying on opposite sides of a longitudinal axis of the wedge, the first wedge face forming an abutment face constituting a wall of the recess, said abutment face being engageable by one of the cutting faces and arranged at an acute angle to said side wall, said second wedge face engaging the tool holder body, said wedge further having a longitudinal axis along which it is displaceable;
g. an adjustment bolt threadably engageable with a cooperating screw thread in at least one of said body and said wedge, whereby rotation of said adjustment bolt effects longitudinal adjustment of said wedge;
h. means to fix said wedge to said tool holder;
i. means to clamp a tool bit on the tool holder against at least the end and side walls of the recess; and
j. a bearing block on at least said wedge, said bearing block being pivotable about an axis substantially perpendicular to said floor, said cooperating screw thread being formed in said bearing block.

3. A tool holder as claimed in claim 2, wherein said second wedge face is provided with a generally dovetail form undercut and further comprising means defining a complementary undercut in the cooperating face of said tool holder body.

4. A tool as claimed in claim 2, wherein said second wedge face is convex.

5. A tool holder as claimed in claim 2, wherein said bearing block comprises an additional bolt threadably fitted into said body, and having a transverse threaded bore in which said adjustment bolt is engaged, the longitudinal axes of the additional bolt and the adjustment bolt are in an intersecting relationship.

6. A tool holder according to claim 2, and further comprising a bearing block in the wedge and a bearing block in the holder body, the bearing blocks each having threads therein, the thread of one block being of opposite hand to that of the other block, and wherein the adjustment bolt has co-operating threads of opposite hand.

7. A tool holder as claimed in claim 5, further comprising means defining a screw driver slit accessible to turn the additional bolt from the exterior.

8. A tool holder for a generally rhombic turning tool bit, having a pair of parallel main cutting faces, a pair of parallel subsidiary cutting faces, arranged at an obtuse angle to the main cutting faces, parallel end faces blunting the acute angles of the rhombic tool bit and parallel upper and lower faces, said holder comprising, in combination:

a. a tool holder body;
b. means defining an open sided tool bit receiving recess in the tool holder body;
c. a floor of said recess engageable by the lower face of the tool bit;
d. an end wall of the recess engageable by one of the end faces of the tool bit;
e. a side wall of the recess engageable by one of the main cutting faces;
f. a first adjustable stop mounted adjustably on the body;
g. an abutment face on the first adjustable stop, forming a wall of the recess, engageable by one of the main subsidiary cutting faces and arranged at an acute angle to said side wall;
h. means to clamp a tool bit on the tool holder against at least the end and side walls of the recess; and
i. a second adjustable stop, a face on said second adjustable stop, forming said side wall of the recess, said second adjustable stop being pivotable about an axis substantially perpendicular to said floor.

9. A tool holder as claimed in claim 8, wherein the second abutment has a convex face, opposite said face forming the side wall, the convex face having the shape of a segment of a circle centered about the swivelling axis of said second stop, and further comprising a complementary concave face on said tool holder body.

10. In a tool including a generally rhombic turning tool bit, having a pair of parallel main cutting faces, a pair of parallel subsidiary cutting faces, a pair of parallel end faces blunting the acute angles of the tool bit, upper and lower faces extending parallel to one another; the tool further including a tool holder having means defining a recess for receiving the tool bit, the improvement comprising in combination:

a. means defining a throughgoing bore in said tool bit, said bore having an axis normal to said upper and lower faces;
b. an abutment face forming part of said tool holder and bounding said recess, said abutment face being in engagement with one of said end faces of said tool bit;
c. a bolt means forming part of said tool holder and passing through said bore in said tool bit, said bolt means having an axis coextensive with the axis of said bore;
d. clamping means forming part of said tool holder, said clamping means engaging said bolt means and urging said bolt means in a direction that is radial to its axis, whereby said bolt means urges said tool bit against said abutment face;
e. a movable member forming part of said tool holder and having a support face engaging said tool bit along one of said subsidiary cutting faces; and
f. means for moving said movable member along said one of said subsidiary cutting faces of said tool bit for angularly adjusting said tool bit about said bolt means.

11. A tool as defined in claim 10, wherein said movable member is a wedge having a longitudinal axis disposed parallel to its direction of displacement; the improvement further comprising a contact face on said wedge, said contact face being spaced from said support face and having a convex shape; and a stationary face in contact with said support face.

12. A tool as defined in claim 10, wherein said movable member has a first part connected to said means for moving said movable member; said movable member further having a second part carrying said support face; the improvement further including pivot means for swingably mounting said second part on said first part about an axis substantially normal to the upper and lower faces of said tool bit.

13. A tool as defined in claim 12, wherein said second part of said movable member includes a circularly arcuate convex surface; said first part of said movable member includes a circularly arcuate concave surface; said convex and concave surfaces are in face-to-face relationship with one another.

14. A tool as defined in claim 10, wherein said means for moving said movable member includes a threaded spindle oriented parallel with the direction of displacement of said movable member; the improvement further comprising an additional bolt member held in said movable member for pivotal displacement about an axis normal to said upper and lower faces of said tool bit, said additional bolt member including a threaded bore threadedly engaging said spindle.

15. A tool as defined in claim 14, wherein said additional bolt member is held in said movable member with a loose fit, said threaded spindle has a longitudinal axis intersecting the axis of said bolt means.

16. A tool as defined in claim 15, further comprising means defining a screw driver slit in said additional bolt, said slit being accessible from the outside to turn said additional bolt.

* * * * *